(12) United States Patent
Oikawa

(10) Patent No.: US 9,223,758 B1
(45) Date of Patent: Dec. 29, 2015

(54) DETERMINING A LANGUAGE ENCODING DATA SETTING FOR A WEB PAGE, AND APPLICATIONS THEREOF

(75) Inventor: Takuya Oikawa, Tokyo (JP)

(73) Assignee: Google Inc., Mountain View, CA (US)

( * ) Notice: Subject to any disclaimer, the term of this patent is extended or adjusted under 35 U.S.C. 154(b) by 580 days.

(21) Appl. No.: 13/524,186

(22) Filed: Jun. 15, 2012

(51) Int. Cl.
*G06F 17/00* (2006.01)
*G06F 17/21* (2006.01)
*G06F 17/22* (2006.01)

(52) U.S. Cl.
CPC .......... *G06F 17/211* (2013.01); *G06F 17/2264* (2013.01)

(58) Field of Classification Search
CPC .............................. G06F 17/211; G06F 17/2264
USPC ......... 715/235, 256, 264, 269, 200, 234, 236, 715/255
See application file for complete search history.

(56) References Cited

U.S. PATENT DOCUMENTS

| | | | |
|---|---|---|---|
| 5,062,143 A * | 10/1991 | Schmitt | 382/230 |
| 6,240,170 B1 * | 5/2001 | Shaffer et al. | 379/142.15 |
| 6,701,320 B1 | 3/2004 | Marple | |
| 2003/0078987 A1 | 4/2003 | Serebrennikov | |
| 2008/0040424 A1 * | 2/2008 | Hines | 709/203 |
| 2009/0199085 A1 * | 8/2009 | Park | 715/234 |
| 2009/0210213 A1 | 8/2009 | Cannon et al. | |
| 2012/0253814 A1 * | 10/2012 | Wang et al. | 704/260 |
| 2012/0254181 A1 * | 10/2012 | Schofield et al. | 707/737 |

* cited by examiner

*Primary Examiner* — Stephen Hong
*Assistant Examiner* — Gregory J Vaughn
(74) *Attorney, Agent, or Firm* — McDermott Will & Emery LLP

(57) ABSTRACT

Systems, methods and computer storage mediums automatically apply a language encoding data setting to a web page. Embodiments of the present disclosure relate to equipping a web browser with the ability to automatically open web pages with an appropriate language encoding data setting applied to the web page so that the web page is displayed without garbled characters. The web browser is able to determine the appropriate language encoding setting by requesting the appropriate language encoding setting for the web page that is stored in a language encoding database that is updated each time the web page is successfully opened without displaying garbled characters.

33 Claims, 5 Drawing Sheets

Example Language Encoding Data Setting Table

| URL of Web Page | Language which Characters Included in Web Page Embody | Language Encoding Data Setting | Count |
|---|---|---|---|
| www.sportswebpage.com/socialencoding.html | Japanese | iso-2022-jp | 2040596 |
| www.sportswebpage.com/socialencoding.html | Japanese | euc-jp | 3 |
| www.mywebpage.com/language.html | Korean | euc-kr | 39494 |
| www.myemail.com/international | English (US) | utf-8 | 1929494 |

FIG. 3

DETERMINING A LANGUAGE ENCODING DATA SETTING FOR A WEB PAGE, AND APPLICATIONS THEREOF

BACKGROUND

Often times when a web browser displays a web page incorrectly, the web browser either detects an incorrect language in which to display the web page and/or the character encoding applied to the web page by the web browser is incorrect. If language detection fails, the web browser displays characters with an incorrect font for the language. If character encoding fails, the web browser displays unreadable characters or "garbled characters."

When the web browser displays the web page incorrectly, a user must explicitly change the language detection setting and/or the character encoding setting until the web browser displays the web page correctly. For some languages, several encoding settings are available for which the user must explicitly apply each encoding setting until the web browser is no longer displayed with the garbled characters. Automatic detection capabilities for the language detection setting and/or character encoding setting can be enabled for the web browser. However, such auto detection capabilities rely on internal algorithms to the web browser that may not properly display all web pages correctly.

BRIEF SUMMARY

Embodiments of the present disclosure relate to automatically applying a correct language and/or encoding setting to a web page. In an embodiment, a computer implemented method includes receiving a request to load a web page. A language encoding data setting for the web page based on the language encoding data setting provided by a language encoding database may be determined, where the language encoding data setting received from the language encoding database is a language encoding data setting most frequently selected by viewers of the web page. The language encoding data setting provided by the language encoding database may be applied to the web page. The web page may be rendered based on the language encoding data setting applied to the web page.

In an embodiment, a system provides a language encoding data setting to a web page. A user request manager is configured to receive a request to load a web page. A language encoding data setting determiner is configured to determine a language encoding data setting for the web page based on the language encoding data setting provided by a language encoding database where the language encoding data setting received from the language encoding database is a language encoding data setting most frequently selected by viewers of the web page. A language encoding data setting applier is configured to apply the language encoding data setting provided by the language encoding database to the web page. A web page renderer is configured to render the web page based on the language encoding data setting applied to the web page.

In an embodiment, a computer storage medium encoded within a computer program where the program comprises instructions that when executed by one or more processors cause the one or more processors to perform operations to provide a language encoding data setting to a web page. A request to open a web page may be received. A language encoding data setting for the web page may be determined based on the language encoding data setting provided by a language encoding database where the language encoding data setting received from the language encoding database is a language encoding data setting most frequently selected by viewers of the web page. The language encoding data setting provided by the language encoding database may be applied to the web page. The web page may be rendered based on the language encoding data setting applied to the web page.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers can indicate identical or functionally similar elements.

FIG. 3 depicts an example language encoding data setting table.

DETAILED DESCRIPTION

This disclosure generally relates to the field of web browsers. In an example embodiment, a user requests to open a web page in a web browser. The web browser requests a language encoding data setting from a language encoding database in which to apply to the web page so that the web page is not rendered with garbled characters. The language encoding database searches for a language encoding data setting for the web page that has been requested to be opened by the web browser. The language encoding database provides the language encoding data setting to the web browser. The web browser applies the language encoding data setting to the web page and renders the web page without garbled characters. The web browser then updates the language encoding database with the language encoding data setting which rendered the web page without garbled characters.

In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

Figure 1:
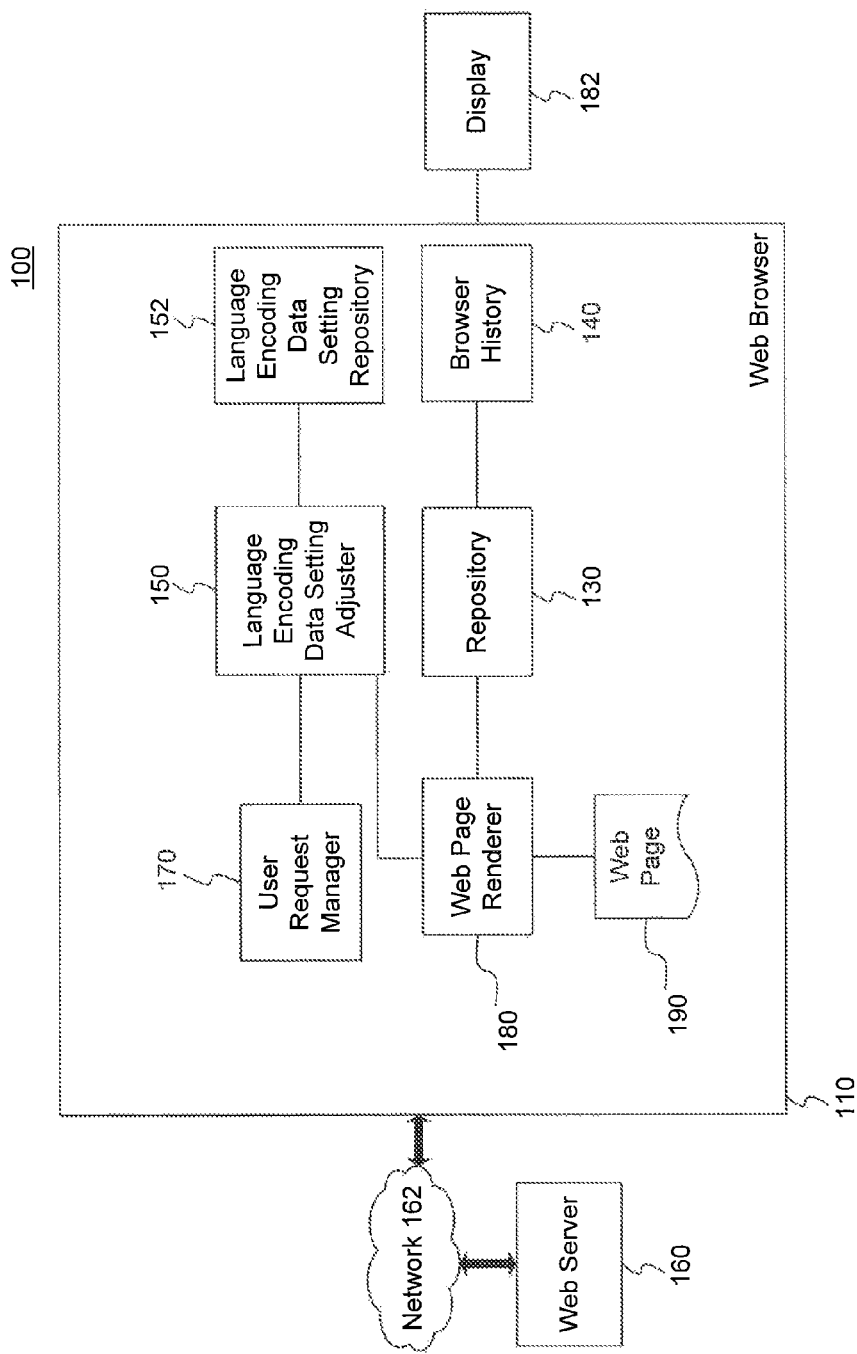
FIG. 1 shows an illustration of a conventional web browser system architecture.

FIG. 1 shows an illustration of a conventional web browser system architecture 100. Web browser system architecture 100 includes a conventional web browser 110, a web server 160, a network 162, and a display 182. Web browser 110 includes a user request manager 170, a repository 130, a browser history 140, a language encoding data setting adjuster 150, a language encoding data setting repository 152, a web page renderer 180, and a web page 190. Although architecture 100 is described herein with reference to one web browser and one web server, one of skill in the art will recognize that architecture 100 may also include more than one web browser and more than one web server.

Web browser 110 and web server 160 may be connected over network 162. Web browser 110 can include software applications that allow a user to view or download content that is available on network 162, such as on a website on the World Wide Web. Content may include text, files, images, audio, video and personal communications. Web page 190 may be generated using one or more browser-supported languages including but not limited to, JavaScript, VBScript, Hyper Text Markup Language (HTML), or any other type of language for writing web pages. Web page 190 may be served over the network using one or more servers as may be necessary. The location of each web page may be identified by a location address, such as a Uniform Resource Locator (URL). The URL can be entered into a web address field of web browser 110 by the user in order to navigate to the particular web page corresponding to the URL.

Web server 160 can be, for example, and without limitation, a telecommunications server, a web server, or other type of database server. Web server 160 may contain web applications which generate content in response to an hypertext transfer protocol (HTTP) request. The web server packages the generated content and serves the content to a client (not shown) in the form of an HTTP response. Web server 160 is a software component that responds to an HTTP request with an HTTP reply. As illustrative examples, web server 160 may be, without limitation, an Apache HTTP Server, Apache Tomcat, Microsoft Internet Information Server, JBoss Application Server, WebLogic Application Server, or Sun Java System Web Server. Web server 160 may serve content such as HTML, extendable markup language (XML), documents, videos, images, multimedia features, or any combination thereof. This example is strictly illustrative and does not limit the scope of the present disclosure.

Web browser 110 can run on any computing device. Similarly, web server 160 can be implemented using any computing device capable of serving data to a client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory and user interface display.

The user requests web page 190 by placing the request to user request manager 170. In an embodiment, the user places the request for web page 190 to user request manager 170 by selecting or typing a website address associated with web page 190 that is stored on web server 160. In response to the request, web server 160 delivers web page 190 to user request manager 170.

Web browser 110 may use a number of one or more well-known communication protocols and standards to obtain or manage content flow. Web browser 110 may primarily use HTTP to fetch content and web pages. HTTP is an application-level protocol providing basic request/response semantics.

HTTP can be used for requesting and retrieving objects from a server. Web browser 110 may send an HTTP request, such as a request for web page 190, to web server 160 over a network or combination of networks such as the Internet. Web server 160 receives the HTTP request and returns an HTTP response, such as content for the requested web page. When web browser 110 receives web page 190, web browser 110 can render web page 190 for the user. For example, web page renderer 180 can render the web page 190 for viewing by a user on a display 182. Display 182 can be any type of display device including, but not limited to, a touchscreen display, a cathode ray tube (CRT) monitor, or liquid crystal display (LCD) screen. As would be apparent to a person skilled in the relevant art given this description, the user can also interact with web browser 110 to perform various tasks such as, for example, directing web browser 110 to different web pages. Web browser 110 receives user input from one or more input devices (not shown), such as, for example, a mouse, keyboard, or touch screen.

Web server 160 helps deliver resources to web browser 110. A resource is any data that can be provided over the network. The resource is identified by a resource address that is associated with each resource. Resources include HTML pages, such as web page 190, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). In an embodiment, web server 160 helps deliver resources to web browser 110 that make up web page 190.

Resources encountered by the user when operating web browser 110 may be recorded in browser history 140 of web browser 110. Resources recorded in browser history 140 may include but are not limited to the browsing history of the web pages encountered by the user, such as web page 190, while operating web browser 110. Resources recorded in browser history 140 may also include but are not limited to images, videos, text and any other resources encountered by the user while operating web browser 110. Resources recorded in browser history 140 may also include but are not limited to images, videos, text and any other resources downloaded by the user while operating web browser 110. Resources included in browser history 140 may be stored by web browser 110 in repository 130. Repository 130 may be any temporary and/or permanent storage location associated with web browser 110 such as but not limited to a cache.

Typically, user request manager 170 receives requests from a user to load web pages that include characters that represent the native language of the user. For example, a user who resides in China is likely to request user request manager 170 to load web pages having characters that represent the Chinese language. As a result, web browser 110 is set at a predetermined language encoding data setting. The predetermined encoding data setting includes a Chinese language setting that detects the Chinese language and character encoding settings that encode characters from the Chinese language. When web browser 110 loads web page 190 in the Chinese language, web page 190 is thus correctly rendered by web page renderer 180 and displayed by display 182 so that the Chinese characters included in web page 190 are properly displayed to the user.

However, in some instances, user request manager 170 may receive a request to load web page 190, where web page 190 includes characters in a foreign language that differs from the native language of the user. In turn, web page 190 includes a language and characters different from those which web browser 110 typically loads, renders, and displays. Web browser 110 may not be automatically set at the setting for the foreign language. Web browser 110 then applies an incorrect setting to web page 190. As a result, the characters included in web page 190 that are rendered by web page renderer 180 and displayed by display 182 are garbled. The garbled characters are characters that are distorted and unreadable to the user.

The user determines that the characters included in web page 190 loaded by web browser 110 are garbled. The setting applied to web page 190 is correct when the user determines that there are no garbled characters present in web page 190. Garbled characters in web page 190 are avoided when the language of web page 190 was properly detected so that the proper character settings were applied to web page 190 and web page 190 was properly encoded. Web page renderer 180 then renders web page 190 based on the applied language encoding setting and display 182 properly displays web page 190 to the user.

The setting is incorrect when the language of web page 190 was not properly detected and/or the character encoding settings applied to web page 190 did not properly encode web page 190. Web page renderer 180 then renders web page 190 with the improper encoding settings so that display 182 displays web page 190 with garbled characters to the user. The user then manually adjusts the setting until the correct setting is determined and web page 190 is properly rendered and displayed.

The user manually adjusts the setting for web browser 110 with adjuster 150. The user manually adjusts the setting until the user no longer detects garbled characters in web page 190 and web page 190 is no longer rendered and displayed with garbled characters. The user manually adjusts the setting based on the language encoding data settings that are stored in repository 152. The user manually continues to select each setting stored in repository 152 until the user determines that the setting selected by the user and applied by web browser 110 eliminates the garbled characters from web page 190. At that point, web page renderer 180 renders web page 190 and display 182 displays web page 190 without any garbled characters.

For example, assume that the user resides in China so that the setting is predetermined and set to detect the Chinese language and apply encoding settings that encode characters in the Chinese language. The user requests (via user request manager 170) that web browser 110 load web page 190. Web page 190 includes characters from the Japanese language. Web browser 110 fails to recognize that web page 190 includes characters from the Japanese language and incorrectly applies the setting for characters included in the Chinese language. The user recognizes garbled characters in web page 190 based on the incorrect setting being applied to web page 190. Web page renderer 180 renders web page 190 with the garbled characters and display 182 displays web page 190 with the garbled characters to the user. The user recognizes that the incorrect setting was applied to web page 190 by web browser 110.

The user manually adjusts the setting with adjuster 150 to find the correct setting to apply to web page 190. However, the Japanese language is a complex language in that four different encoding settings may be applied to web page 190 to properly encode the Japanese characters included in web page 190. The four different encoding settings include iso-2022-jp, euc-jp, shift-jis, and also the universally usable character code utf-8. Each of these four different encoding settings are stored in repository 152.

The user manually selects the iso-2022-jp Japanese encoding setting from repository 152 by manually adjusting adjuster 150. The user determines that garbled characters are still present in web page 190 so that web page renderer 180 renders web page 190 with garbled characters and display 182 displays web page 190 with garbled characters to the user. As a result, the iso-2022-jp Japanese encoding setting is also an incorrect setting to apply to web page 190.

The user then manually selects the euc-jp Japanese encoding setting from repository 152 by manually adjusting adjuster 150. The user determines that garbled characters are still present in web page 190 so that web page renderer 180 renders web page 190 with garbled characters and display 182 displays web page 190 with garbled characters to the user. As a result, the euc-jp Japanese encoding setting is also an incorrect setting to apply to web page 190.

The user then manually selects the shift-jis Japanese encoding setting from repository 152 by manually adjusting adjuster 150. The user determines that garbled characters are no longer present in web page 190 so that web page renderer 180 renders web page 190 correctly without garbled characters, and display 182 displays web page 190 correctly without garbled characters to the user. As a result, the shift-jis Japanese encoding setting is the correct setting to apply to web page 190.

Figure 2:
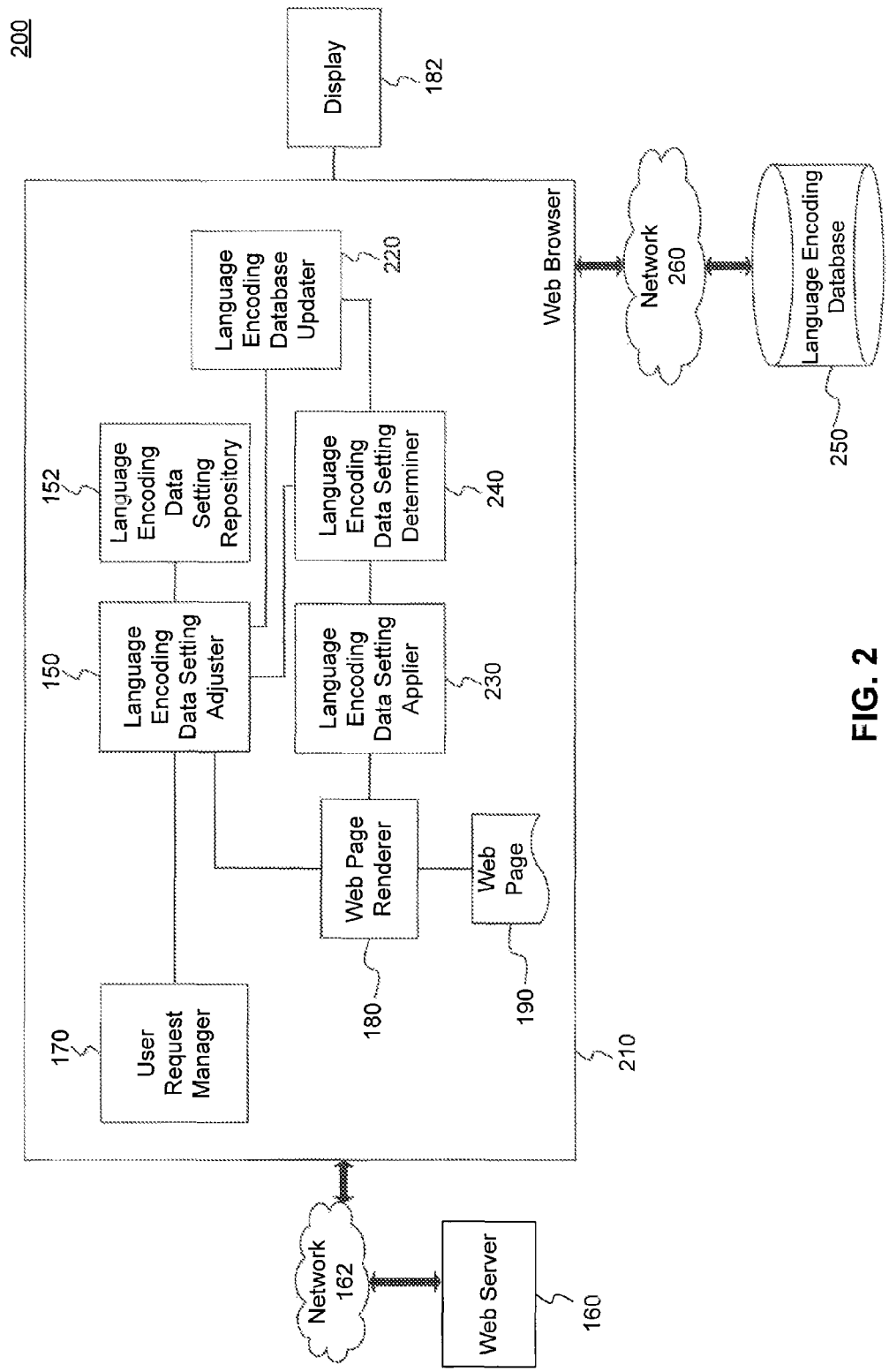
FIG. 2 depicts a detailed view of automatic language encoding data setting detection in a block diagram of an exemplary web browser system architecture.

FIG. 2 depicts a detailed view of an exemplary web browser system architecture 200 for automatic language encoding data setting detection. Web browser system architecture 200 includes web browser 210, web server 160, display 182, network 162, network 260, and language encoding database 250. Web browser 210 includes user request manager 170, language encoding data setting adjuster 150, language encoding data setting repository 152, web page renderer 180, web page 190, language encoding database updater 220, language encoding data setting determiner 240, and language encoding data setting applier 230.

As noted above, the user manually adjusts the setting based on the language encoding data settings stored in repository 152 when the user recognizes garbled characters in web page 190. In an embodiment, the setting may be automatically determined and applied to web page 190, so that the requirement to manually adjust the setting is eliminated. The appropriate setting may be retrieved by web browser 210 from database 250 and applied to web page 190, so that web page may be correctly rendered without any garbled characters. Database 250 may be updated by web browser 210 with the appropriate setting each time web page 190 is correctly rendered without any garbled characters.

Web browser 210 and database 250 may have a cloud computing configuration. Web browser 210 and database 250 may share resources via network 260. For example, web browser 210 may retrieve language encoding data settings for a plurality of web pages from database 250 via network 260. Web browser 210 may also update database 250 via network 260 with language encoding data settings for the plurality of web pages. Based on the cloud computing configuration, the interaction between web browser 210 and database 250 may not be limited to a single web browser. A plurality of web browsers may update database 250 via a network 260 with language encoding data settings for the plurality of web pages. Database 250 may provide each of the updates for the language encoding data settings completed by each of the web browsers to any web browser that requests the setting.

Web browser 210 may retrieve the language encoding data settings for the plurality of web pages directly from database 250 each time the user requests to open web page 190. Web browser 210 may also download the language encoding data settings for the plurality of web pages from database 250 in periodic increments and store the language encoding data settings locally to web browser 210 in repository 152. Downloading the language encoding data settings from database 250 in periodic increments may ensure that updates to the language encoding data settings provided by other web browsers following the previous download are captured by web browser 210.

As noted above, web page renderer 180 renders web page 190 based on the setting provided by adjuster 150. In an embodiment, updater 220 may update database 250 with the setting provided by adjuster 150 each time that web page renderer 180 renders web page 190 correctly without garbled characters.

Updater 220 may refrain from updating database 250 each time the setting is applied to web page 190 by adjuster 150. As noted above, some languages may include multiple language encoding data settings that may be applied to web page 190. Adjuster 150 may apply several language encoding data settings to web page 190 before identifying the correct encoding data setting that correctly renders web page 190 without any garbled characters. Updater 220 may update database 250 with the setting once the correct setting has been identified by language encoding data setting adjuster 150.

In another embodiment, updater 220 may remain idle for a period of time after the setting has been applied to web page 190. If a second language encoding data setting is not applied to web page 190 by adjuster 150 after the period of time passes, it is likely that the correct language encoding data setting has been applied to web page 190 by adjuster 150. Updater 220 may then update database 250 with the setting. In an embodiment, web browser 210 may request from the user permission for updater 220 to update database 250 with the setting.

Database 250 may store a plurality of language encoding data settings for a plurality of web pages, such as web page 190. Database 250 may store a table where each web page included in the table may also have an appropriate setting listed with the web page. The table may include data for each web page so that the appropriate setting may be correctly updated in database 250 for the respective web page.

For example, FIG. 3 depicts an example language encoding data setting table 300. Data for each web page that updater 220 may provide to database 250 may include the URL of each web page, the language of characters included in each web page, and the setting that correctly rendered web page 190 without garbled characters.

In an embodiment, table 300 includes a count that represents the number of times the web page listed has been updated by updater 220 with the setting. For example as shown in FIG. 3, web page 190 may have the URL, www.mywebpage.com/language.html. Each time that updater 220 updates www.mywebpage.com/language.html in database 250 with the setting of euc-kr, the count is updated in table 300. As shown in FIG. 3, updater 220 updated www.mywebpage.com/language.html with the setting of euc-kr an example total of 39,494 times.

The count provided by the database 250 may identify an incorrect language encoding data setting for web page 190 that may have been provided by updater 220. For example as shown in FIG. 3, web page 190 may have the URL www.sportswebpage.com/socialencoding.html. In this example, updater 220 updated www.sportswebpage.com/socialencoding.html with setting of iso-2022-jp a total of 2,040,596 times. Updater 220 also updated the same web page having the URL www.sportswebpage.com/socialencoding.html a total of 3 times. A comparison between the count of 2,040,596 in which setting of iso-2022-jp was updated and a count of 3 in which setting of euc-jp was updated provides a significant discrepancy between each. The significant discrepancy likely signifies that the setting of euc-jp is an incorrect setting to be applied to www.sportswebpage.com/socialencoding.html and likely resulted in web page renderer 180 rendering web page 190 with garbled characters.

As noted above, user request manager 170 may receive a request to load web page 190, where web page 190 includes characters that represent a foreign language. However, in an embodiment, rather than having adjuster 150 adjust the setting, the appropriate setting may automatically be retrieved by web browser 210. In an embodiment, determiner 240 may retrieve the appropriate setting for web page 190 from database 250, so that web page 190 may be correctly rendered without garbled characters. Determiner 240 may retrieve the appropriate setting for web page 190 from database 250 based on the data stored in the encoding data setting table for web page 190. For example, as shown in FIG. 3, determiner 240 may retrieve the setting of utf-8 for the URL www.myemail.com/international as listed by the language encoding data setting table.

Applier 230 may then apply the setting retrieved by determiner 240 to web page 190. Web page renderer 180 may render web page 190 correctly without garbled characters, and display 182 may display web page 190 correctly without garbled characters to the user.

Determiner 240 may update adjuster 150 when determiner 240 cannot retrieve a setting from database 2,50. Once updated, adjuster 150 may apply each setting stored by repository 152 to web page 190 until web page 190 is rendered correctly without garbled characters. The process applied by adjuster 150 is similar to the process explained in detail above.

Determiner 240 may select the setting from database 250 for web page 190 that exceeds a minimum count as provided by the language encoding data setting table. As noted above, the table may include a count that represents each time the web page listed has been updated by updater 220 with the setting. The minimum count may represent a first threshold that provides an increased likelihood that the setting is the appropriate setting for web page 190, such that web page 190 may be rendered without garbled characters.

For example, a minimum count that the setting should satisfy for determiner 240 to select the setting may be 10,000. As shown in FIG. 3, the count for the setting of euc-kr regarding www.mywebpage.com/language.html is 39,494. The count of 39,494 exceeds the minimum count of 10,000. Accordingly, determiner 240 retrieves the setting of euc-kr for www.mywebpage.com/language.html based on the count of 39,494.

Determiner 240 may update adjuster 150 when determiner 240 cannot retrieve a setting that exceeds the minimum count from database 250. Once updated, adjuster 150 may operate in a similar fashion as noted above.

Determiner 240 may select the setting from database 250 for web page 190 that exceeds a minimum count difference as provided by the language encoding data setting table. The minimum count difference may be based on the difference between the count of a first language encoding data setting for web page 190 as listed by the language encoding data setting table and the count of a second language encoding data setting for web page 190 as listed by the language encoding data setting table. The first data language encoding data setting may exceed the minimum count difference when the difference between the count for the first data language encoding data setting and the count for the second data language encoding data setting exceeds a second threshold. The second threshold provides an increased likelihood that the first language encoding data setting is the appropriate setting for web page 190 such that web page 190 may be rendered without garbled characters. As noted above, the count provided by the database 250 may identify an incorrect language encoding data setting for web page 190 that may have been provided by updater 220.

For example, the minimum count difference that the setting should satisfy for language encoding data setting determiner 240 to select the setting may be 5,000. As shown in FIG. 3, the count for the language encoding data setting of iso-2022-jp regarding the web page with URL www.sportswebpage.com/socialencoding.html is 2,040,596. The count for setting of euc-jp regarding the same web page with URL www.sportswebpage.com/socialencoding.html is 3. The count difference between the count for the setting of iso-2022-jp and the count for the setting of euc-jp is 2,040,593. The count difference of 2,040,593 exceeds the minimum count difference of 5,000. Determiner 240 thus retrieves the setting of iso-2022-jp for www.sportswebpage.com/socialencoding.html based on the count difference of 2,040,593.

Determiner 240 may update adjuster 150 when determiner 240 cannot retrieve a setting that exceeds the minimum count difference from database 250. Once updated, adjuster 150 may operate in a similar fashion as noted above.

Figure 4:
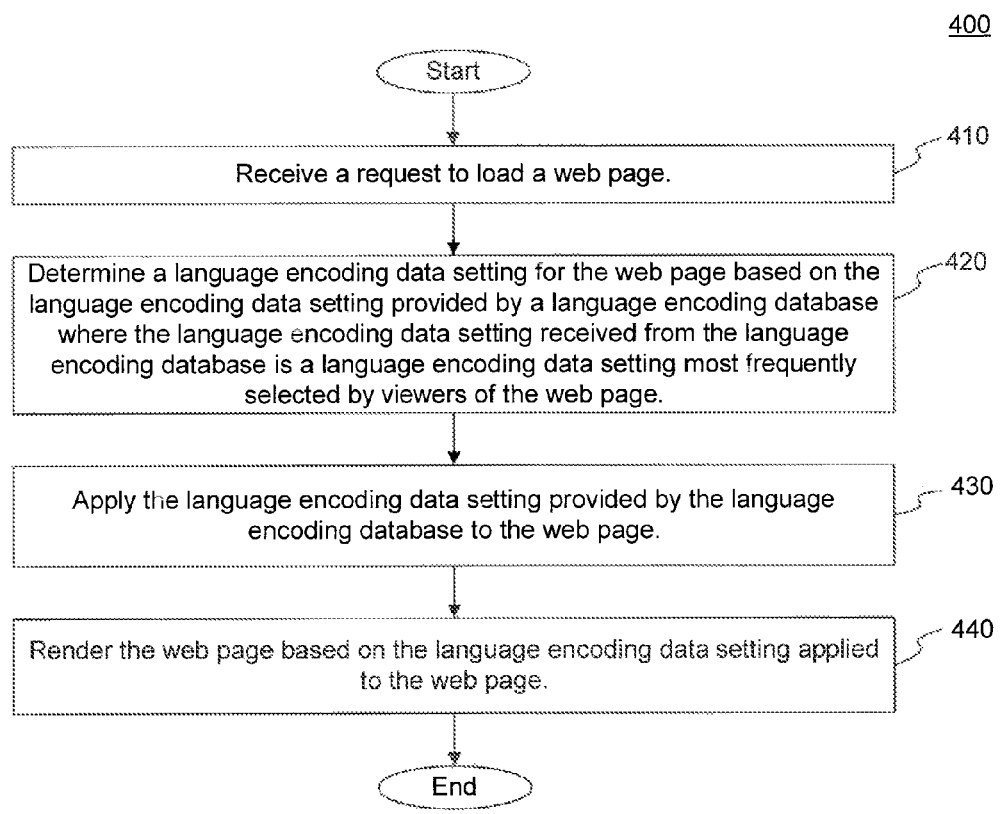
FIG. 4 is a flowchart showing an example method 400 of automatically applying a language encoding data setting to a web page.

FIG. 4 is a flowchart showing an example method 400 of automatically applying a language encoding data setting to a web page. As shown in FIG. 4, method 400 begins at stage 410, when a request is received to load the web page. For example, as shown in FIG. 2, user request manager 170 receives a user request to open web page 190 when the user enters the request into user request manager 170. Stage 410 can be performed by, for example, user request manager 170.

At stage 420, a language encoding data setting is determined for the web page based on the language encoding data setting provided by a language encoding database, where the language encoding data setting received from the language encoding database is a language encoding data setting most frequently selected by viewers of the web page. For example, as shown in FIG. 2, language encoding data setting determiner 240 determines a language encoding data setting for web page 190 based on the language encoding data setting provided by language encoding database 250. The language encoding data setting received from language encoding database 250 is a language encoding data setting most frequently selected by viewers of web page 190. Stage 420 can be performed by, for example, language encoding data setting determiner 240.

At stage 430, the language encoding data setting provided by the language encoding database is applied to the web page. For example, as shown in FIG. 2, language encoding data setting applier 230 applies the language encoding data setting provided by language encoding database 250 to web page 190. Stage 430 can be performed by, for example, language encoding data setting applier 230.

At stage 440, the web page is rendered based on the language encoding data setting applied to the web page. For example, as shown in FIG. 2, web page renderer 180 renders web page 190 based on the language encoding data setting applied to web page 190. Stage 440 can be performed by, for example, web page renderer 180.

Embodiments can work with software, hardware, and/or operating system implementations other than those described herein. Any software, hardware, and operating system implementations suitable for performing the functions described herein can be used. Embodiments are applicable to both a client and to a server or a combination of both.

Figure 5:
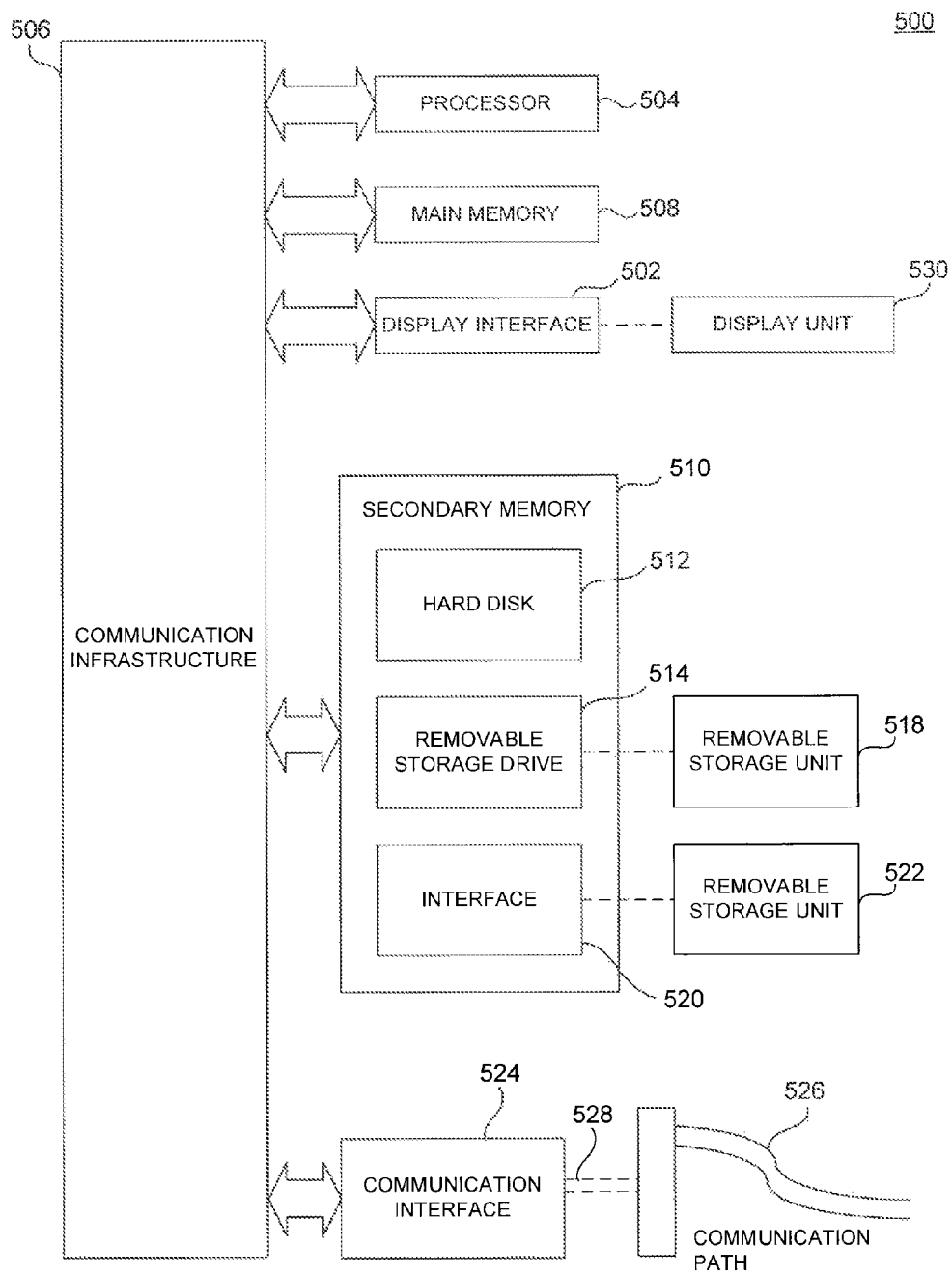
FIG. 5 illustrates an example computer system in which embodiments of the present invention, or portions thereof, may be implemented as computer-readable code.

FIG. 5 illustrates an example computer system 500 in which embodiments of the present invention, or portions thereof, may be implemented as computer-readable code. For example, web browser 210 may be implemented in computer system 500 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, a computing device having at least one processor device, such as processor device 504, where the processor device may be a single processor, a plurality of processors, a processor in a multi-core/multi-processor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526.

In this document, the terms "computer program storage medium" and "computer usable storage medium" are used to generally refer to storage media such as removable storage unit 518, removable storage unit 522, and a hard disk installed in hard disk drive 512. Computer program storage medium and computer usable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement embodiments as discussed herein. In particular, the computer programs, when executed, enable processor device 504 to implement the processes of the disclosure, such as the stages in the method illustrated by flowchart 400 of FIG. 4 discussed above. Accordingly, such computer programs represent controllers of the computer system 500. Where an embodiment is implemented using software, the software may be stored in a computer program product and loaded into computer system 500 using removable storage drive 514, interface 520, and hard disk drive 512, or communications interface 524.

The Brief Summary and Abstract sections may set forth one or more but not all example embodiments and thus are not intended to limit the scope of the present disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer implemented method, comprising:
   receiving a request to load a web page;
   determining a language encoding data setting for the web page based on the language encoding data setting provided by a language encoding database, wherein the language encoding data setting received from the language encoding database is a language encoding data setting most frequently selected by viewers of the web page, wherein the language encoding database maintains a count of a number of correct times the language encoding data setting has been used for the webpage and provides the language encoding data setting if the count exceeds a first threshold;
   applying the language encoding data setting provided by the language encoding database to the web page; and
   rendering the web page based on the language encoding data setting applied to the web page.

2. The method of claim 1, further comprising:
   receiving a selection of a new language encoding data setting; and
   uploading the new language encoding data setting to the language encoding database.

3. The method of claim 1, wherein the adjusting further comprises:
   applying a language encoding data setting from a plurality of language encoding data settings stored in a language encoding data setting repository until a final language encoding data setting that removes at least one garbled character from the web page is determined.

4. The method of claim 1, wherein the language encoding data setting is provided in a data encoding data list when an updating of the language encoding data setting exceeds the first threshold and a second threshold, wherein the second threshold is a difference in a first quantity in which the web page is updated with a first language encoding data setting and a second quantity in which the web page is updated with a second language encoding data setting.

5. The method of claim 1, further comprising updating the language encoding database when a final language encoding data setting is determined that eliminates at least one garbled character from being displayed by the web page.

6. The method of claim 1, further comprising requesting permission to update the language encoding database with the language encoding data setting.

7. The method of claim 1, further comprising automatically updating the language encoding database with the language encoding data setting.

8. The method of claim 1, wherein the language encoding data setting includes a language detection setting and an encoding detection setting.

9. The method of claim 1, wherein the language encoding data setting includes a set of language encoding data for the web page.

10. The method of claim 9, wherein the set of language encoding data for the web page includes a uniform resource locator (URL) for the web page, the language of the web page, the language encoding data setting of the web page, and a count representing each time the language encoding database is updated with the language encoding data setting.

11. The method of claim 1, wherein the examining of the language encoding data list provided by the language encoding database further comprises automatically downloading the language encoding data list from the language encoding database based on a periodic interval.

12. The method of claim 11, wherein the downloaded language encoding data list is examined locally.

13. The method of claim 1, further comprising receiving data from a plurality of browsers that have requested to load the web page.

14. The method of claim 1, wherein the determining and the applying are performed without a selection by a user of which language encoding data setting to apply.

15. The method of claim 1, wherein if the count does not exceed the first threshold, further comprising providing a user-selected language encoding data setting.

16. The method of claim 1, wherein the web page is requested from a first web server, and wherein the language encoding data setting is received from a second web server different from the first web server.

17. The method of claim 1, wherein the receiving is performed by a browser, and wherein the applying the language encoding data setting comprises applying the language encoding data setting to a browser setting.

18. A system, comprising:
  a user request manager that is configured to receive a request to load a web page;
  a processor comprising a language encoding data setting determiner that is configured to determine a language encoding data setting for the web page based on the language encoding data setting provided by a language encoding database, wherein the language encoding data setting received from the language encoding database is a language encoding data setting most frequently selected by viewers of the web page, wherein the language encoding database maintains a count of a number of correct times the language encoding data setting has been used for the webpage and provides the language encoding data setting if the count exceeds a first threshold;
  a language encoding data setting applier that is configured to apply the language encoding data setting provided by the language encoding database to the web page; and
  a web page renderer that is configured to render the web page based on the language encoding data setting applied to the web page.

19. The system of claim 18 further comprising:
  a language encoding data setting adjuster that is configured to receive a selection of a new language encoding data setting; and
  a language encoding database updater that is configured to upload the new language encoding data setting to the language encoding database.

20. The system of claim 18, wherein the language encoding data setting adjuster further comprises:
  an applying module that is configured to apply a language encoding data setting from a plurality of language encoding data settings stored in a language encoding data setting repository until a final language encoding data setting that removes at least one garbled character from the web page is determined.

21. The system of claim 18, wherein the language encoding data setting is provided in a data encoding data list when the language encoding data updated by the updating module exceeds the first threshold and the second threshold, wherein the second threshold is a difference in a first quantity in which the web page is updated by the updating module with a first language encoding data setting and a second quantity in which the web page is updated by the updating module with a second language encoding data setting.

22. The system of claim 21, wherein an updating module updates the language encoding database when a final language encoding data setting is determined that eliminates the at least one garbled character from being displayed by the web page.

23. The system of claim 18, comprising:
  a requestor module that requests permission to update the language encoding database with the language encoding data setting.

24. The system of claim 18, wherein an updating module automatically updates the language encoding database with the language encoding data setting.

25. The system of claim 18, wherein the language encoding data setting includes a language detection setting and an encoding detection setting.

26. A non-transitory computer readable storage medium encoded with a computer program operating on one or more processors, the program comprising instructions that when executed by the one or more processors cause the one or more processors to perform operations comprising:
  receiving a request to load a web page;
  determining a language encoding data setting for the web page based on the language encoding data setting provided by a language encoding database, wherein the language encoding data setting received from the language encoding database is a language encoding data setting most frequently selected by viewers of the web page, wherein the language encoding database maintains a count of a number of correct times the language encoding data setting has been used for the webpage and provides the language encoding data setting if the count exceeds a first threshold;
  applying, by the one or more processors, the language encoding data setting provided by the language encoding database to the web page; and
  rendering the web page based on the language encoding data setting applied to the web page.

27. The computer readable storage medium of claim 26, further comprising:
  receiving a selection of a new language encoding data setting; and
  uploading the new language encoding data setting to the language encoding database.

28. The computer readable storage medium of claim 26, wherein the language encoding data setting is provided in the data encoding data list when an updating of the language encoding data setting exceeds the first threshold and a second threshold, wherein the second threshold is a difference in a first quantity in which the web page is updated with a first language encoding data setting and a second quantity in which the web page is updated with a second language encoding data setting.

29. The computer readable storage medium of claim 26, further comprising updating the language encoding database when a final language encoding data setting is determined that eliminates at least one garbled character from being displayed by the web page.

30. The computer readable storage medium of claim 26, further comprising requesting permission to update the language encoding database with the language encoding data setting.

31. The computer readable storage medium of claim 26, further comprising automatically updating the language encoding database with the language encoding data setting.

32. The computer readable storage medium of claim 26, wherein the language encoding data setting includes a language detection setting and an encoding detection setting.

33. The computer readable storage medium of claim 26, wherein the language encoding data setting includes a set of language encoding data for the web page.

\* \* \* \* \*